(12) United States Patent
Yeung et al.

(10) Patent No.: US 12,408,216 B2
(45) Date of Patent: Sep. 2, 2025

(54) MANAGING COMMUNICATION BETWEEN A USER DEVICE AND A VEHICLE

(71) Applicant: Rivian IP Holdings, LLC, Irvine, CA (US)

(72) Inventors: Fai Yeung, Palo Alto, CA (US); Zhenxiang Kui, Langley (CA); Leonid Kokhnovych, Burnaby (CA); Erhun Arkan, Vancouver (CA)

(73) Assignee: Rivian IP Holdings, LLC, Irvine, CA (US)

( * ) Notice: Subject to any disclaimer, the term of this patent is extended or adjusted under 35 U.S.C. 154(b) by 358 days.

(21) Appl. No.: 17/852,042

(22) Filed: Jun. 28, 2022

(65) Prior Publication Data

US 2023/0114701 A1 Apr. 13, 2023

Related U.S. Application Data

(60) Provisional application No. 63/255,264, filed on Oct. 13, 2021.

(51) Int. Cl.
*H04W 12/30* (2021.01)
*H04W 12/08* (2021.01)
*H04W 76/14* (2018.01)

(52) U.S. Cl.
CPC ........... *H04W 76/14* (2018.02); *H04W 12/08* (2013.01)

(58) Field of Classification Search
CPC ..... H04W 76/14; H04W 12/08; H04W 4/023; H04W 4/48; H04W 12/50; H04W 84/18; H04W 92/18

USPC ......................................................... 455/411
See application file for complete search history.

(56) References Cited

U.S. PATENT DOCUMENTS

| | | | |
|---|---|---|---|
| 9,794,753 B1 * | 10/2017 | Stitt | H04W 12/06 |
| 2019/0304226 A1 * | 10/2019 | Golsch | G01S 5/0273 |
| 2020/0122686 A1 | 4/2020 | Siswick et al. | |
| 2021/0291786 A1 | 9/2021 | Cisneros | |
| 2021/0345110 A1 * | 11/2021 | Revadigar | B60R 25/24 |
| 2021/0370870 A1 * | 12/2021 | Furuta | E05B 49/00 |

FOREIGN PATENT DOCUMENTS

| | | |
|---|---|---|
| CN | 106792431 A | 5/2017 |
| CN | 110798795 A | 2/2020 |
| CN | 111252032 A | 6/2020 |
| CN | 111919238 A | 11/2020 |
| CN | 112116735 A | 12/2020 |
| CN | 113068160 A | 7/2021 |
| WO | 2021/141949 A1 | 7/2021 |

* cited by examiner

*Primary Examiner* — Tanmay K Shah
(74) *Attorney, Agent, or Firm* — Haley Guiliano LLP

(57) ABSTRACT

Systems and methods are provided for managing communications between a vehicle and a user device. A user device may be determined to be authorized to communicate with a vehicle. A signal strength of a signal transmitted between the vehicle and the user device is determined, and a determination is made whether the signal strength exceeds a threshold signal strength. In response to determining that the signal strength exceeds the threshold signal strength, a communication command is enabled to be transmitted from the user device to the vehicle.

20 Claims, 7 Drawing Sheets

MANAGING COMMUNICATION BETWEEN A USER DEVICE AND A VEHICLE

CROSS-REFERENCE TO RELATED APPLICATION

This application claims the benefit of U.S. Provisional Application No. 63/255,264 filed Oct. 13, 2021, the disclosure of which is hereby incorporated by reference herein in its entirety.

INTRODUCTION

Many vehicles are configured to enable a user to wirelessly perform a function (e.g., lock and unlock doors of the vehicle, pair a device to media system of a vehicle) with a key fob or mobile device. For example, a user's smartphone may provide an option to pair the smartphone with the vehicle over a Bluetooth® connection for establishing communication with the vehicle.

SUMMARY

In some circumstances, when a smartphone is on the edge of the Bluetooth signal range (perhaps unbeknownst to the user), the smartphone may begin to behave erratically. For example, the smartphone may lose link-layer encryption with the vehicle, revoke previous bonding information and fail to re-establish a new bond with the vehicle, the user interface of the smartphone may freeze or deadlock, and/or become vulnerable for exploitation when re-bonding is attempted, such as by way of man-in-the-middle (MITM) attacks. In these circumstances, the user may be locked out of his or her vehicle (e.g., if no other means to access vehicle are available), may need to restart his or her smart phone in order to re-establish communications between the smartphone and vehicle, which may be time-consuming and frustrating for the user, and the user's data may have been exploited. Consequently, what is needed are techniques for providing a more robust vehicle application on a user device that is capable of communicating with a vehicle while avoiding the above-described user device malfunctions on the edge of signal range, in order to enhance the user experience and provide data security for the user.

Accordingly, systems and methods are disclosed herein for determining a signal strength of a signal transmitted between a vehicle and a user device, determining whether the signal strength exceeds a threshold signal strength, and in response to determining that the signal strength exceeds the threshold signal strength, enabling a communication command to be transmitted from the user device to the vehicle.

In some embodiments, the user device is a smartphone, a connection is established between the vehicle and the smartphone, and enabling the communication command to be transmitted from the smartphone to the vehicle comprises enabling a vehicle application implemented on the smartphone to transmit the communication command to the vehicle.

In some embodiments, the user device is a smartphone, and the communication command comprises a packet to initiate a connection between the user device and the vehicle.

In some embodiments, determining the signal strength of the signal transmitted between the vehicle and the user device is performed based on sampling the signal strength of the signal a plurality of times over a predefined time period.

In some embodiments, the provided systems and methods may, in response to determining that the signal strength does not exceed the threshold signal strength, prohibit the communication command from being transmitted from the user device to the vehicle.

In some embodiments, the communication command is transmitted using Bluetooth Low Energy communication protocol.

In some embodiments, the provided systems and methods may determine one or more of location data associated with the user device, temperature data associated with a location of the user device, humidity data associated with the location of the user device, communication event timestamps associated with communication between the user device and the vehicle, or user attention data associated with the user device, and adjust the threshold signal strength based on at least one of the location data, the temperature data, the humidity data, the communication event timestamps, or the user attention data.

In some embodiments, enabling the communication command to be transmitted from the user device to the vehicle is further performed based on at least one of the location data, the temperature data, the humidity data, the communication event timestamps, or the user attention data.

In some embodiments, enabling the communication command to be transmitted from the user device to the vehicle further comprises training a machine learning model to accept as input the determined signal strength and at least one of the location data, the temperature data, the humidity data, the communication event timestamps, or the user attention data, and output a determination of whether to enable the transmitting of the communication command from the user device to the vehicle.

In some embodiments, a non-transitory computer-readable medium may be provided having non-transitory computer-readable instructions encoded thereon that, when executed by a processor, causes the processor to determine a signal strength of a signal transmitted between a vehicle and a user device, determine whether the signal strength exceeds a threshold signal strength, and in response to determining that the signal strength exceeds the threshold signal strength, enable a communication command to be transmitted from the user device to the vehicle.

In some embodiments, a system may be provided comprising a vehicle configured to communicate with a user device, and processing circuitry configured to determine a signal strength of a signal transmitted between a vehicle and a user device, determine whether the signal strength exceeds a threshold signal strength, and in response to determining that the signal strength exceeds the threshold signal strength, enable a communication command to be transmitted from the user device to the vehicle.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1:
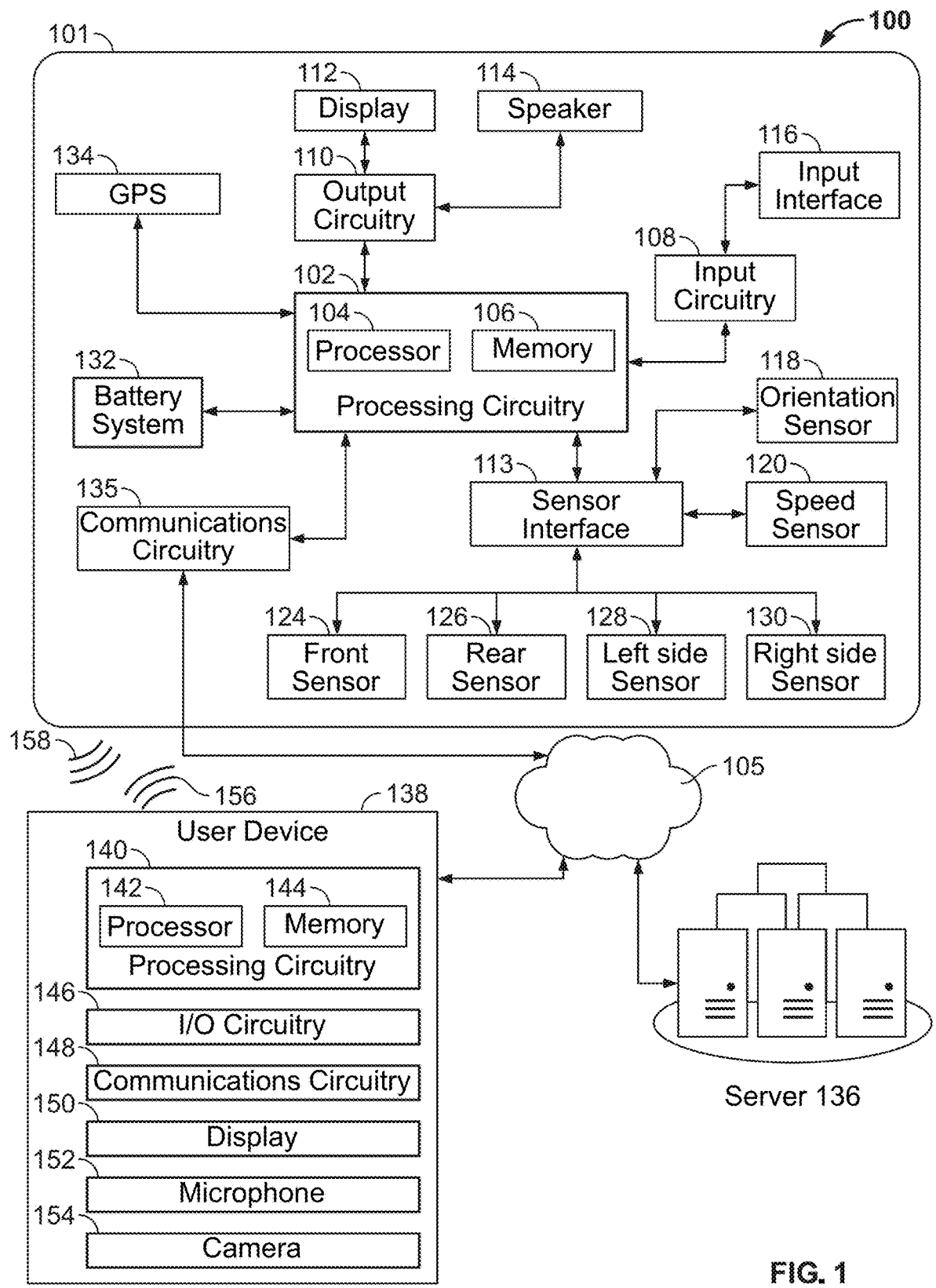
FIG. 1 shows a block diagram of components of a system configured to determine whether to enable a communication command to be transmitted from a user device to a vehicle, in accordance with some embodiments of the present disclosure.

FIG. 1 shows a block diagram of components of a system configured to determine whether to enable a communication command to be transmitted from a user device to a vehicle, in accordance with some embodiments of the present disclosure. System 100 may comprise vehicle 101, which may be in communication with server 136 and user device 138 via one or more networks 105. Vehicle 101 may be a car (e.g., a coupe, a sedan, a truck, an SUV, a bus), a motorcycle, an aircraft (e.g., a drone), a watercraft (e.g., a boat), or any other type of vehicle. In some embodiments, vehicle 101 may be configured to operate autonomously or semi-autonomously.

Vehicle 101 may comprise processing circuitry 102 which may comprise processor 104 and memory 106. Processor 104 may comprise a hardware processor, a software processor (e.g., a processor emulated using a virtual machine), or any combination thereof. In some embodiments, processor 104 and memory 106 in combination may be referred to as processing circuitry 102 of vehicle 101. In some embodiments, processor 104 alone may be referred to as processing circuitry 102 of vehicle 101. Memory 106 may comprise hardware elements for non-transitory storage of commands or instructions, that, when executed by processor 104, cause processor 104 to operate vehicle 101 in accordance with embodiments described above and below. Processing circuitry 102 may be communicatively connected to components of vehicle 101 via one or more wires, or via wireless connection.

Processing circuitry 102 may be communicatively connected to input interface 116 (e.g., a steering wheel, a touch screen display, buttons, knobs, a microphone or other audio capture device, or any other suitable input interface or any combination thereof) via input circuitry 108. In some embodiments, a driver or operator or passenger of vehicle 101 may be permitted to select certain settings in connection with the operation of vehicle 101 (e.g., to indicate whether vehicle 101 should operate autonomously). In some embodiments, processing circuitry 102 (and/or processing circuitry 140 of user device 138 and/or processing circuitry of one or more servers 136) may be configured to execute computer-readable instructions to determine whether to enable the transmitting of a communication command from user device 138 to vehicle 101, based on a signal strength of a signal (e.g., 156 and/or 158) transmitted between vehicle 101 and user device 138, and/or based on any other suitable factors. For example, user device 138 may be configured to execute a mobile application (e.g., a vehicle application provided by a manufacturer of vehicle 101) to perform the techniques described above and below.

In some embodiments, processing circuitry 102 may be communicatively connected to GPS 134 or other positioning device of vehicle 101, where the driver or operator or passenger may interact with the GPS system via input interface 116. GPS 134 may be in communication with multiple satellites and/or servers 136 remote from vehicle 101 to ascertain the location of vehicle 101 and provide navigation directions to processing circuitry 102. As another example, the positioning device may operate on terrestrial signals, such as cell phone signals, Wi-Fi signals, or ultra-wideband signals to determine a location of vehicle 101. The determined location may be in any suitable form such as a geographic coordinate, a street address, a nearby landmark such as an identification of the nearest charging station or a tagged location associated with the vehicle (e.g., a location of a home of the user stored in memory 106). In some embodiments, processing circuitry 102 may use the determined location to identify whether vehicle 101 is within a threshold range of a tagged location.

Processing circuitry 102 may be communicatively connected to display 112 and speaker 114 by way of output circuitry 110. Display 112 may be located at a dashboard of vehicle 101 and/or a heads-up display at a windshield of vehicle 101. For example, an interface for GPS 134 or an interface of an infotainment system may be generated for display, and display 112 may comprise an LCD display, an OLED display, an LED display, or any other type of display. Speaker 114 may be located at any location within the cabin of vehicle 101, e.g., at the dashboard of vehicle 101, on an interior portion of the vehicle door, etc.

Processing circuitry 102 may be communicatively connected (e.g., by way of sensor interface 113) to sensors (e.g., front sensor 124, rear sensor 126, left side sensor 128, right side sensor 130, orientation sensor 118, speed sensor 120). Orientation sensor 118 may be an inclinometer, an accelerometer, a tiltmeter, any other pitch sensor, or any combination thereof and may be configured to provide vehicle orientation values (e.g., vehicle's pitch and/or vehicle's roll) to processing circuitry 102. Speed sensor 120 may be one of a speedometer, a GPS sensor, or the like, or any combination thereof, and may be configured to provide a reading of the vehicle's current speed to processing circuitry 102. Front sensor 124, rear sensor 126, left side sensor 128, and/or right side sensor 130 may be positioned at a variety of locations of vehicle 101, and may be one or more of a variety of types, e.g., an image sensor, an ultrasonic sensor, a radar sensor, LED sensor, LIDAR sensor, etc., configured to measure the distance between vehicle 101 and an object in a surrounding environment of the vehicle (e.g., by outputting a light or radio wave signal, and measuring a time for a return signal to be detected and/or an intensity of the returned signal, and/or performing image processing on images captured by the image sensor of the surrounding environment of vehicle 101). In some embodiments, processing circuitry 102 may take into account the acceleration of vehicle 101, e.g., based on sensor data generated by orientation sensor 118, when determining a predicted distance between vehicle 101 and an object.

Processing circuitry 102 may be communicatively connected to battery system 132, which may be configured to provide power to one or more of the components of vehicle 101 during operation. In some embodiments, vehicle 101 may be an electric vehicle or a hybrid electric vehicle.

User device 138 (e.g., a smartphone, a tablet, a computer, a key fob, etc.) may comprise processing circuitry 140 including processing circuitry 140 and memory 144, input/output (I/O) circuitry 146, communications circuitry 148, display 150, and microphone 152, camera 154, and any number of other suitable components. In some embodiments, processing circuitry 102 of vehicle 101 may be in communication (e.g., via communications circuitry 135) with processing circuitry 140 of user device 138 (e.g., via communications circuitry 148). Such connection may be wired or wireless.

In some embodiments, communications circuitry 135 and communications circuitry 148 may respectively comprise network transceivers, which may each comprise an antenna and one or more sensors (e.g., BLE sensors or proximity sensors) and other control circuitry (e.g., protocol converters, rate converters, signal converters), or any combination thereof. Communications circuitry 135 and communications circuitry 148 may be configured to communicate using a wireless short-range radio communication technique, such as, for example, via Bluetooth low energy (BLE) by way of signals 156, 158, or by way of near-field communication (NFC), or using any other suitable short-range RF communication technique or other short-range communication technique. Using one or more of such communication techniques, user device 138 may be operable by a user to instruct or request vehicle 101 to perform various functions and/or vehicle 101 may perform various functions in response to determining user device 138 is approaching vehicle 101 (e.g., unlocking and locking doors or hatches, pairing to a media system of vehicle 101, starting or turning of vehicle 101, signaling a panic condition, etc.) over the communication path.

In some embodiments, communications circuitry 135 of vehicle 101 may comprise a sensor configured to advertise a vehicle identifier or vehicle application identifier (e.g., over a BLE link) to user device 138, and communications circuitry 148 of user device 138 may perform scanning to receive the advertisement packet and respond with a connection request packet to initiate a persistent connection between user device 138 and vehicle 101. In some embodiments, communications circuitry 148 of user device 138 may comprise a sensor configured to advertise a user device identifier or mobile application identifier (e.g., over a BLE link) to vehicle 101, and communications circuitry 135 of vehicle 101 may perform scanning to receive the advertisement packet and respond with a connection request packet to initiate a persistent connection between user device 138 and vehicle 101. The advertising packet may be transmitted via one-way communication where an advertising packet is repeatedly transmitted any suitable number of times over a predefined time interval. In some embodiments, the advertising packet may be directed (e.g., to a known device such as user device 138, which may have established a prior connection with vehicle 101) or undirected (e.g., to multiple devices in the vicinity of vehicle 101 regardless of whether such devices previously established a connection with vehicle 101). In some embodiments, identifiers of services supported by the advertising device (e.g., a peripheral, such as vehicle 101) may be communicated to a scanning device (e.g., a central device, such as user device 138) via a BLE advertising packet. Upon discovering the advertising packet, the central device may initiate a two-way communication between user device 138 and vehicle 101.

In order to securely transmit instructions and/or access certain data (e.g., in BLE, known as characteristic attributes, such as, for example, a battery level associated with battery system 132 of vehicle 101) at vehicle 101, user device 138 may initiate a pairing process between vehicle 101 and user device 138. In some embodiments, the pairing process may comprise establishing a temporary key (TK), e.g., entered by the user or otherwise established by BLE sensors (and/or any other suitable sensor) for user device 138 and/or vehicle 101, which may be used to a short term key (STK) which is used to encrypt communications between vehicle 101 and user device 138. In some embodiments, a long term key (LTK) may be used to encrypt communications between vehicle 101 and user device 138 using any suitable encryption protocol (e.g., AES-128). The LTK may be generated by vehicle 101 and user device 138 by generating respective public-private key pairs, exchanging respective public keys of the pairs, and using the public keys to create a shared secret, e.g., using the Elliptic-curve Diffie-Hellman (ECDH) key exchange protocol. In some embodiments, vehicle 101 may transmit a security request to user device 138. In some embodiments, pairing may be initiated automatically by user device 138 or requested by a user via I/O circuitry 146 of user device 138. In some embodiments, certain characteristics attribute may require encryption, and thus a request for such characteristics may cause pairing or bonding to be initiated by user device 138 and/or vehicle 101.

In some embodiments, pairing may be required for each new communication session between vehicle 101 and user device 138, e.g., a successful pairing instance may not be preserved for future connections. In some embodiments, vehicle 101 and user device 138 may be configured to bond to each other, where after an initial pairing, bonding may be preserved in future connections without requiring pairing or bonding for each subsequent connection. The LTK may be stored at vehicle 101 and user device 138 to facilitate bonding. Once paired or bonded, vehicle 101 and user device 138 may be configured to communicate in order to perform secure data operations (e.g., enable reading and writing of attributes, notifications and indications regarding a change in a characteristic attribute, receiving incoming commands, requests, and responses over the secure BLE link, etc.). Such data operations may enable user device 138 to receive vehicle status information (e.g., battery level, temperature, etc.) from vehicle 101 over the BLE link, and transmit commands (e.g., remote start, activating a welcome action or welcome sequence, unlock doors or hatches, HVAC control, boot up certain modules of vehicle while user is walking towards vehicle) over the secure BLE link to vehicle 101.

In some embodiments, the aforementioned welcome action may include one or more operations to greet a user. For example, the welcome action may include unlocking a door of the vehicle as well as, e.g., turning on an exterior light of vehicle 101 (e.g., the light bar or headlights), turning on an interior light of vehicle 101, flashing one or more lights in a welcome sequence, outputting, via speaker 114 of vehicle 101, a welcome sound that is audible to the user as he or she approaches vehicle 101 (e.g., "welcome"). In some embodiments, one or more welcome actions may be personalized for the user. For example, the welcome sound may be a personalized greeting, based on a name stored in a profile of a user (e.g., "Welcome Bob"). In some embodiments, the user may create or modify the welcome action (e.g., via input interface 116). In some embodiments, the welcome action may include playing media that is currently playing on the authorized mobile device (e.g., on the entertainment system of vehicle 101).

In some embodiments, communications circuitry 135 and/or communications circuitry 148 may be in communication with one or more servers 136 (e.g., over a communications network 105 such as, for example, the Internet, a local area network, a wide area network, a satellite network, a cellular network, or any other suitable network, or any combination thereof), which may be configured to perform any suitable portions of the processing described above and below. Server 136 may comprise a plurality of servers configured to remotely provide cloud computing resources (e.g., storage, processing, software applications, etc.) to other components of system 100, e.g., user device 138 and/or vehicle 101. In some embodiments, server 136 may be associated with a manufacturer of vehicle 101. In some embodiments, server 136 may comprise a collection of servers, and processing circuitry (and any other suitable components) of server 136 can be distributed across a number of servers.

It should be appreciated that FIG. 1 only shows some of the components of vehicle 101, and it will be understood that vehicle 101 also includes other elements commonly found in vehicles (e.g., electric vehicles), e.g., a motor, brakes, wheels, wheel controls, turn signals, windows, doors, etc.

Figure 2A:
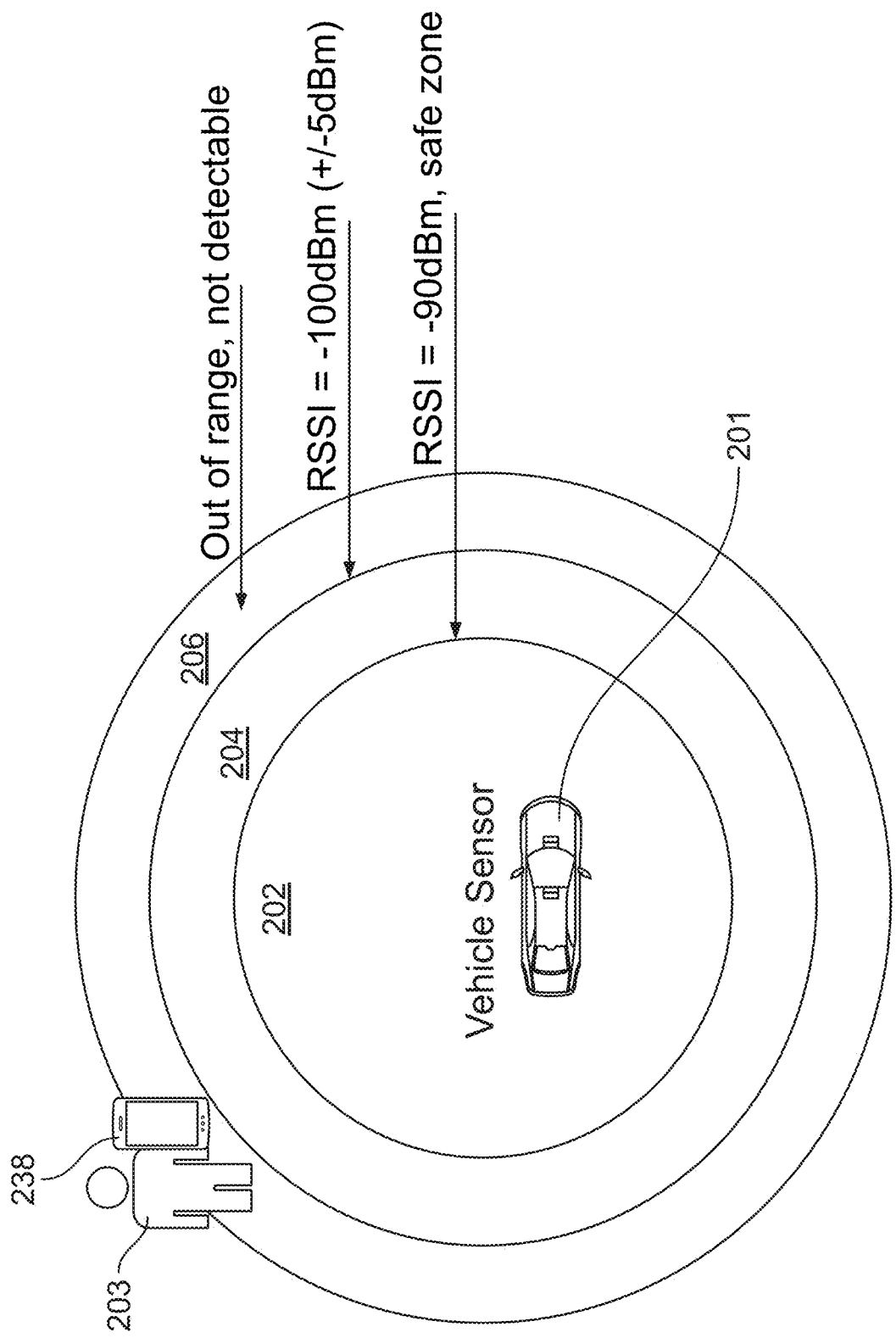
FIGS. 2A-2B show illustrative diagrams for determining whether to enable a communication command to be transmitted from the user device to the vehicle, in accordance with some embodiments of the present disclosure.
Figure 2B:
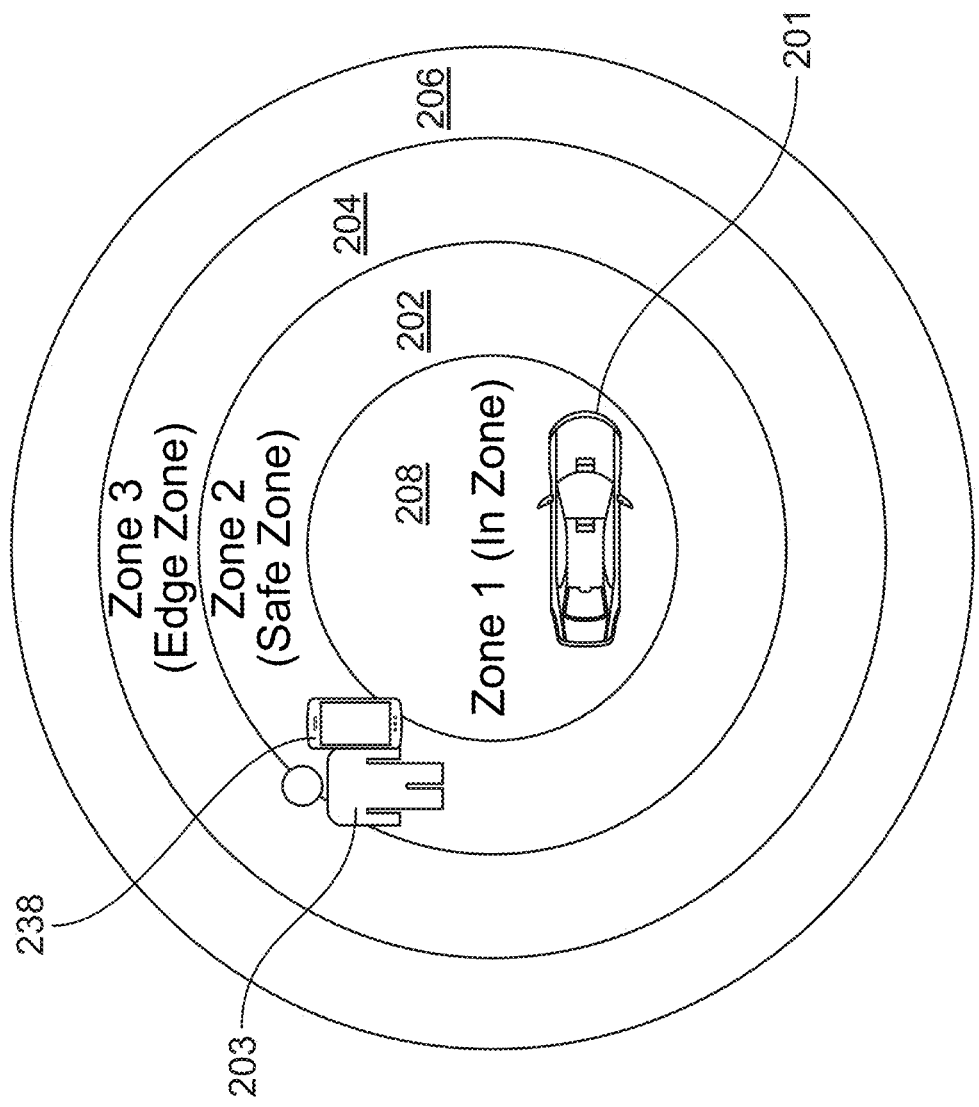

FIGS. 2A-2B show illustrative diagrams for determining whether to enable a communication command to be transmitted from the user device to the vehicle, in accordance with some embodiments of the present disclosure. As shown, a user 203 holding user device 238 (which may correspond to user device 138 of FIG. 1) may be located outside of vehicle 201 (which may correspond vehicle 101 of FIG. 1). In some embodiments, communications circuitry 135 of vehicle 101 may comprise one or more BLE sensors configured to scan or listen for an advertisement from user device 238 of user 203. Alternatively, communications circuitry 148 of user device 238 may comprise one or more BLE sensors configured to scan or listen for an advertisement from vehicle 201. In some embodiments, the role of the user device 238 may depend on the type of user device (e.g., a key fob may be the advertising device with respect to vehicle 201, whereas a smartphone may be a scanning device with respect to vehicle 201, or vice versa).

In some embodiments, processing circuitry 140 may determine a relative received signal strength indicator (RSSI) or a power level of one or more wireless signals received at user device 238 from vehicle 201. For example, the RSSI may correspond to a strength of an advertising packet received from vehicle 201, as seen by user device 238, and a greater RSSI value may indicate a stronger signal being received at user device 238. Based on the RSSI, an estimated distance between the mobile device of the user and vehicle 201 may be determined (e.g., using an equation and/or lookup table that returns distance as a function of RSSI). For example, a more negative dBm value may indicate that user device 238 is further away from vehicle 201, whereas a less negative dBm value may indicate that user device 238 is closer to vehicle 201. In some embodiments, an advertising packet may indicate a transmit power value to user device 238, which may be used in tandem with the RSSI value to calculate a range associated with the BLE signal. In some embodiments, RSSI measurements may be impacted by a hardware or software platform of user device 238 (e.g., an iOS device may show different RSSI values than an Android device at the same distance from vehicle 201).

In some embodiments, prior to processing circuitry 140 and/or processing circuitry 102 determining a signal strength of a signal transmitted between vehicle 101 and user device 138 and/or performing subsequent processing on the basis of such signal strength, processing circuitry 140 and/or processing circuitry 102 may check whether user device 138 is authorized to communicate with vehicle 101. For example, user device 138 may be authorized to communicate with vehicle 101 based on having participated in a previous communication session with vehicle 101, and/or based on being present on a list of devices authorized to communicate with vehicle 101 (e.g., specified by an owner or vehicle 101 via his or her profile). For example, an advertising packet or other signal transmitted or broadcast by vehicle 101 may comprise a vehicle identifier and/or vehicle application identifier, and/or an advertising packet or other signal transmitted or broadcast by user device 138 may comprise a user device identifier or mobile application identifier. Processing circuitry 140 and/or processing circuitry 102 may determine whether user device 138 is authorized to communicate with vehicle 101 based on such received identifier(s). For example, the received identifier(s) may be compared to identifiers associated with previous communication sessions or identifiers specified as otherwise having authorization to communicate with vehicle (e.g., stored at memory 106, memory 144 and/or at server 136, and/or at any other suitable portion of system 100). In some embodiments, if based on such comparison a match is determined indicating that user device 138 is authorized to communicate with vehicle 101, the signal strength determination and/or subsequent processing may be performed. On the other hand, if based on such comparison no match is determined, thus indicating that user device 138 is not authorized to communicate with vehicle 101, another process may be initiated to authorize user device 138. For example, a prompt may be generated for display at user device 138 requesting login credentials associated with a user account or profile associated with vehicle 101, and upon validating such login credentials, the signal strength determination and/or subsequent processing may be performed.

As shown in FIG. 2A, a plurality of zones and virtual fences may be defined based on the received signal strength of signals received by user device 238. For example, zone 206 may correspond to a signal strength at which user device 238 is out of the BLE range of vehicle 201, and user 203 may be unable to even see vehicle 201 when the location of user 203 corresponds to zone 206. The BLE range may vary based on whether obstacles are present between user device 238 and vehicle 201 (which may reduce the BLE signal range) or whether there is a direct line-of-sight therebetween (which may enable a greater BLE range as compared to when obstructions are present). Zone 204 (e.g., an "edge zone") may correspond to a signal strength of, e.g., −100 dBm (±5 dBm) or −100 dBm to −90 dBm, at which user device 238 is far away from vehicle 201 but still may sporadically receive signals from vehicle 201, and zone 202 (e.g., a "safe zone") may correspond to a signal strength of, e.g., −90 dBm or greater, at which user device 238 is relatively close to vehicle 201 (e.g., user 203 can see vehicle 201 from zone 202) and receives signals from vehicle 201. Zone 208 (e.g., "in-zone"; FIG. 2B) may correspond to user 203 and user device 238 being inside vehicle 201 or extremely close to vehicle 201, and may correspond to the highest signal strength measurement (e.g., −100 dBm or greater) at which user device 238 receives signals from user device 238.

In some embodiments, based on a zone that processing circuitry 140 of user device 138 determines that user device 138 is currently associated with, actionable communication between user device 138 and vehicle 201 may be regulated and managed. For example, an advertising packet from vehicle 201 may be received by user device 238, but in response to determining that user device 138 is located in zone 204 or 206, user device 138 may not be permitted to transmit back a request to establish bidirectional communication between user device 238 and vehicle 210 until processing circuitry 140 determines that user device 238 has entered zone 202 or 208. This may avoid the potential issues (e.g., bond loss, deadlock of user device, network vulnerability) associated with sending a request to establish bidirectional communication between user device 238 and vehicle 210 (e.g., over the BLE standard) when user device 238 is at the edge of the BLE range of vehicle 201 at zone 204 or 206.

In response to determining that user device 238 is approaching vehicle 101 and enters zone 202 or zone 208 (e.g., based on measured RSSI values of advertising packets), user device 238 may be permitted to initiate connection with the vehicle 201, and may optionally initiate (or may receive a request from vehicle 201 to initiate) a pairing or bonding of user device 238 and vehicle 201 over the BLE link to enable communications to be encrypted. To determine whether user device 238 is in zone 202, a signal strength of a signal currently being received from vehicle 201 may be determined and compared to a threshold signal strength (e.g., −90 dBm); if the determined signal strength is at or exceeds the threshold, user device 238 may be determined to be in zone 202. Otherwise, user device 238 may be determined to further away than zone 202 and may not be permitted to initiate a connection with vehicle 201 and may not be permitted to initiate paring or bonding. In some embodiments, if user device 238 previously paired or bonded with vehicle 201, an operating system of user device 238 may automatically create a connection at the operating system level, but the mobile application (e.g., vehicle application which may be provided by or otherwise associated with a manufacturer of vehicle 101) running on user device 208 may nonetheless be configured to act on the connection based on whether the determined signal strength exceeds a threshold, or if the signal strength is determined to be steadily increasing in strength at a constant rate of change from one zone to another zone (e.g., progressively stronger from 204 to 202 to 208) so as to indicate that the user device is approaching the vehicle. Alternatively, the mobile application may control the operating system regarding whether to initiate a connection between user device 208 and vehicle 201, even if user device 208 and vehicle 201 were previously paired or bonded.

In some embodiments, certain actions may be permitted based on a zone that user device 238 is located in. For example, upon determining user device 238 of user 203 is located in zone 202 of FIG. 2B, user device 238 may be permitted transmit a request to vehicle 201 to perform (or vehicle 201 may be configured to automatically perform) turning on exterior or interior lights (e.g., to help user 203 locate vehicle 201 in a parking lot). On the other hand, while user device 238 is in zone 202, user device 238 may not be permitted to request (and vehicle 201 may be configured not to perform) that doors or hatches of vehicle 201 be unlocked, until determining that user 203 has entered zone 208 (e.g., to ensure that user 203 is sufficiently close to vehicle 201 prior to unlocking vehicle 201, such as for security concerns if the vehicle is in a large parking lot). Alternately, zone 202 and zone 208 may be treated the same in terms of which communications are permitted by a user device located in zone 202 or zone 208. In some embodiments, user 203 may be permitted to specify (e.g., via user device 238 or input interface 116 of vehicle 101) which commands or requests should be permitted in certain zones (e.g., user 203 may specify that he or she should be able to request to unlock doors or hatches of vehicle 101 once user device 238 enters zone 202).

Figure 3:
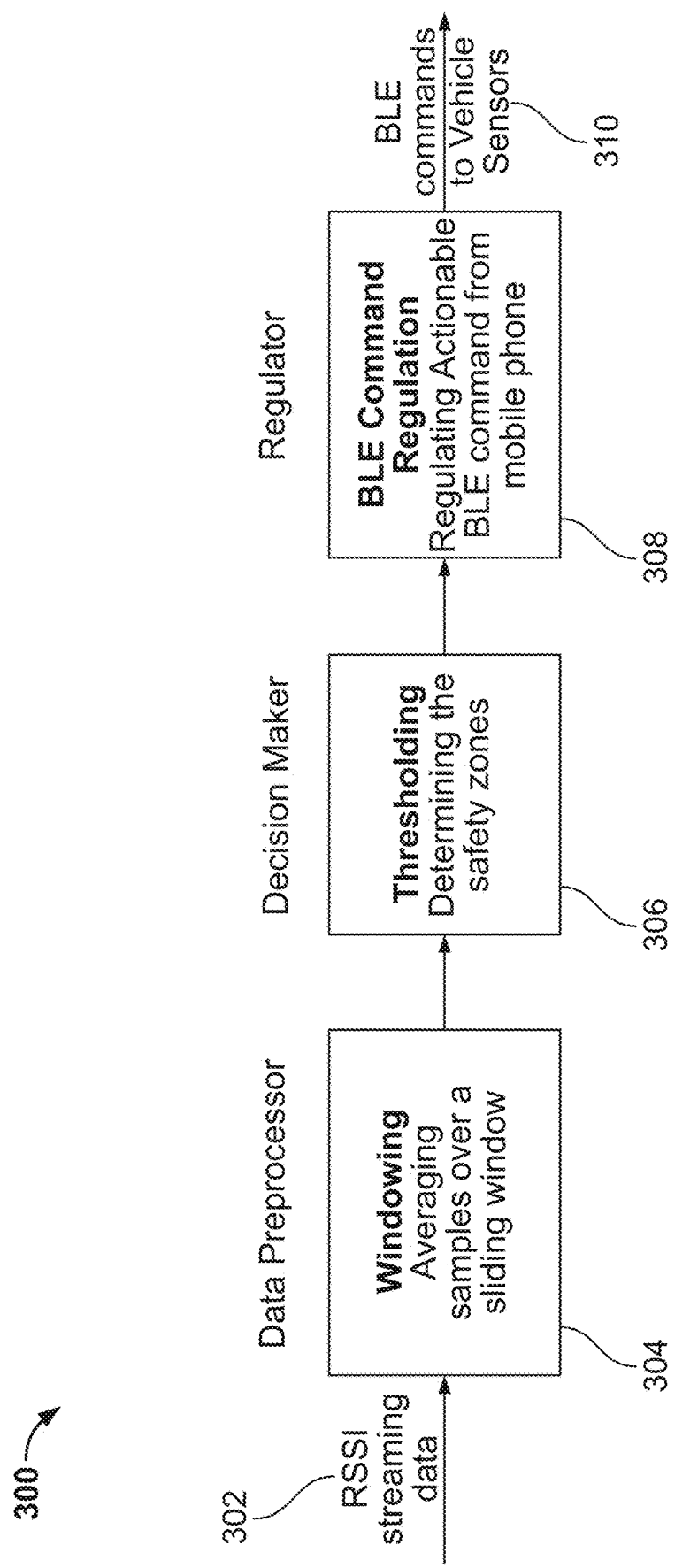
FIG. 3 shows a flowchart of illustrative process for managing communication between a user device and a vehicle, in accordance with some embodiments of the present disclosure.

FIG. 3 shows a flowchart of illustrative process 300 for managing communication between a user device and a vehicle, in accordance with some embodiments of the present disclosure. Process 300 may be executed at least in part by processing circuitry 140 of user device 138 and/or processing circuitry of server 136 and/or processing circuitry 102 of vehicle 101, or any other suitable circuitry, or any combination thereof.

Process 300 may be implemented using a short-range radio communication technique (e.g., BLE) fencing system employing a deterministic algorithm that generates virtual fences based on RSSI data 302 determined by user device 138 based on one or more signals 158 received from vehicle 101. At 304, processing circuitry 140 of user device 138 may process signals received by communications circuitry 148 from communications circuitry 135 to determine RSSI data by sampling the signals received from vehicle 101 at intervals or windows and determining RSSI data for each respective sampled signal. Any suitable sampling rate may be employed, e.g., 10 samples per second, and a measurement may be performed, e.g., every 3 seconds. In some embodiments, an average from among the RSSI data associated with the sampled signals may be computed and used as the signal strength value to be compared to a signal strength threshold.

At 306, a thresholding of RSSI average values over the sliding interval or window may be employed to regulate actionable commands user device 138 is permitted to transmit to sensors (e.g., BLE sensors of vehicle 101) based on a zone that user device 138 is determined to be in within the boundaries defined by the virtual fenced regions. For example, the signal strength determined at 304 may be compared to a threshold signal strength (e.g., −90 dBm, which may correspond a boundary of zone 202), and if the signal strength determined at 304 is determined to be below the threshold signal strength, processing circuitry 140 of user device 138 may cause the vehicle application (e.g., being executed on user device 138) to prohibit user device 138 to transmit certain communication commands. On the other hand, if the signal strength determined at 304 is determined to be at or exceed the threshold signal strength, processing circuitry 140 of user device 138 may cause the vehicle application to enable user device 138 to transmit certain communication commands. For example, as shown at 308 and 310, the communication commands may comprise a packet to initiate a connection between user device 138 and the vehicle 101 (e.g., in response to receiving an advertisement packet from vehicle 101), and/or a characteristic operation (e.g., notify/read/write) to send certain commands from user device 138 to the vehicle 101 or to request vehicle status data from vehicle 101, etc. In some embodiments, if the signal strength determined at 304 is determined to be below the threshold signal strength, but subsequently is determined to be at or above the threshold signal strength (e.g., user device 138 is determined to now be located in zone 208 or zone 202), one or more of such communication commands may be enabled by the vehicle application.

Figure 4:
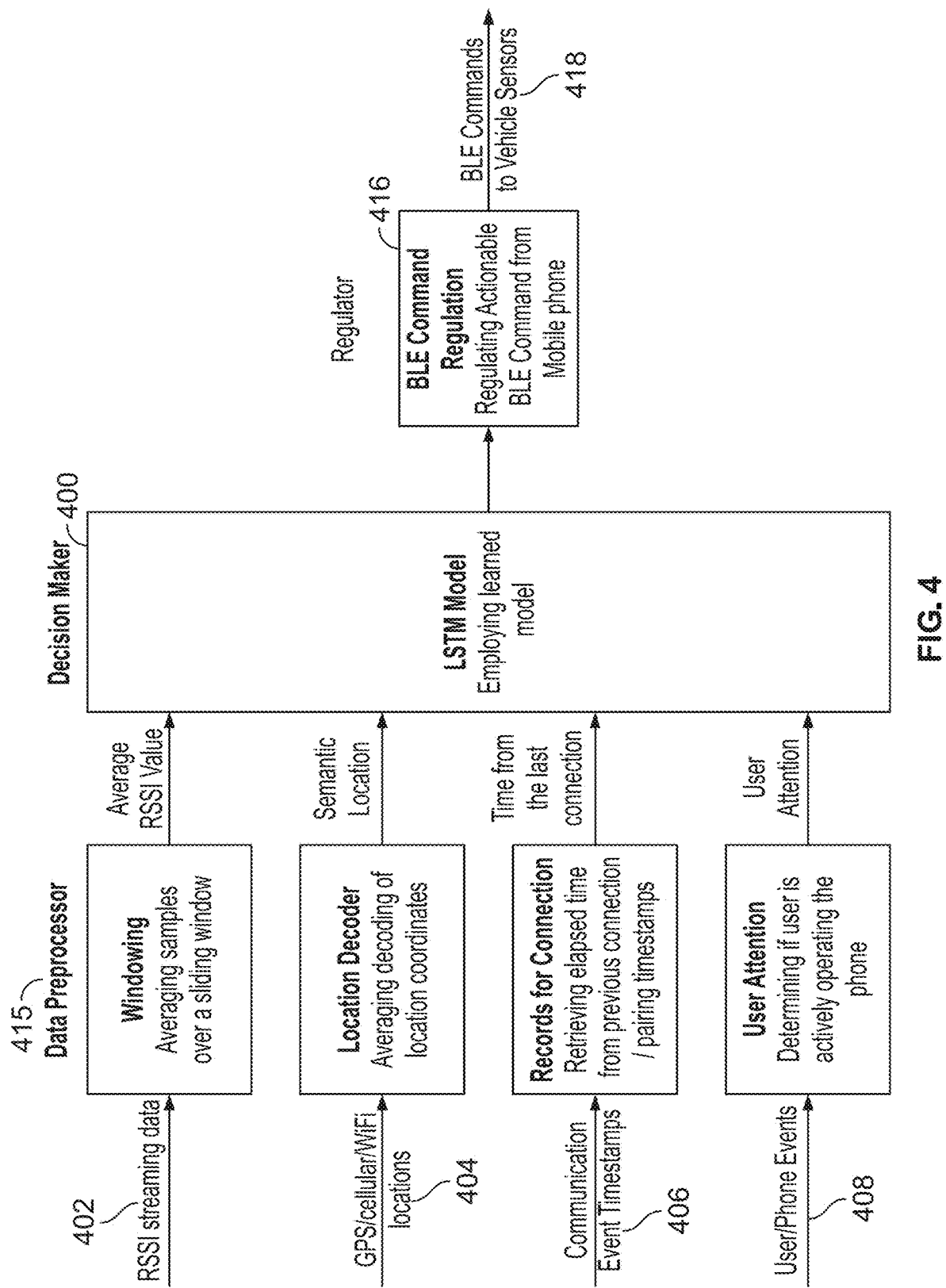
FIG. 4 shows a block diagram of an illustrative machine learning model for use in managing communication between a user device and a vehicle, in accordance with some embodiments of the present disclosure.

In some embodiments, processing circuitry 140 may receive contextual information associated with vehicle 101, which may be taken into account when adjusting the threshold signal strength value, and/or adjusting a boundary of one or more of zones 202, 204, 206, and/or 208, and/or determining which communication commands should be permitted in a particular zone 202, 204, 206, and/or 208. In some embodiments, the contextual information may comprise, as shown in FIG. 4, location data 404 of vehicle 101 and user device 138, communication event timestamps 406 associated with vehicle 101 and user device 138, and/or user attention data 408 associated with vehicle 101 and user device 138, or any suitable combination thereof, which may be analyzed in conjunction with RSSI data 402. In some embodiments, the contextual information may additionally or alternatively comprise temperature data associated with a location of user device 138 and/or the location of vehicle 101, and/or humidity data associated with a location of user device 138 and/or the location of vehicle 101. The contextual information may be used in a heuristic-based analysis, and/or utilized in machine learning techniques.

Location data 404 may be determined based on information received at user device 138 from a GPS of user device 138, GPS 134 of vehicle 101, and/or server 136 over any suitable network (e.g., network 105, such as, for example, a cellular network or Wi-Fi network) to obtain location coordinates of user device 138 and vehicle 101. In some embodiments, location data 404 may comprise semantic location data, e.g., indicating whether a current location of vehicle 101 and/or user device 138 corresponds to a home of user 203, a place of work of user 203, a parking lot of a place of business, etc. In some embodiments, if location data 404 indicates user 203 is parked at home, it may be desirable to allow user 203 to control vehicle 101 at any location within the home, and thus processing circuitry 140 may cause a threshold signal strength to be decreased (or zone 202 or zone 208 to be increased), to allow user device 138 to perform communication commands with vehicle 101 even if signal strength is relatively weak. As another example, if location data 404 indicates that a current location of vehicle 101 and/or user device 138 corresponds to a parking lot, it may be desirable for security purposes to be more strictly set the signal strength threshold, and thus processing circuitry 140 may cause a threshold signal strength to be increased (or zone 202 or zone 208 to be decreased), to limit the ability of user device 138 to perform communication commands with vehicle 101 from the edge of the BLE range.

In some embodiments, user device 138 may determine (e.g., retrieve from a local temperature sensor and a local humidity sensor) or request from another source (e.g., a weather service) weather information (e.g., temperature data and/or humidity data) corresponding to the location of user device 138 indicated by location data 404. In some embodiments, vehicle 101 may transmit weather information associated with the current location of vehicle 101 to user device 138, and/or determine temperature information locally (e.g., using a temperature sensor). User device 138 may take into account one or more of the temperature data and humidity data because both temperature and humidity can affect the values of RSSI data 402. For example, since RSSI is inversely proportional to temperature, and RSSI is directly proportional to humidity, user device 138 or server 136 may instruct vehicle 101 (or vehicle 101 may otherwise determine) to increase a transmission power of wireless signals transmitted to user device 138 based on the temperature data and/or humidity data, e.g., if temperature falls within a certain range or above a certain threshold, increase the transmission power; if humidity falls within a certain range or below a certain threshold, maintain the transmission power or decrease the transmission power. In some embodiments, the signal strength threshold may be adjusted based on the temperature data or humidity data. For example, if the temperature is relatively high, such if the temperature exceeds a predefined threshold or falls within a certain range, the threshold may be lowered in anticipation of the higher temperature causing a decrease in RSSI.

Communication event timestamps 406 may correspond to records (e.g., stored at memory 144 of user device 138 and/or at memory 106 of server 136 or vehicle 101) associated with historical connections between user device 138 and vehicle 101. In some embodiments, communication event timestamps 406 may comprise an elapsed time from a previous connection, timestamps of pairing or bonding events, a log of timestamps associated with commands, requests, notifications, indications or other data operations performed over a BLE link between vehicle 101 and user device 138. Such communication event timestamps may provide insights as to whether communication over the BLE link is irregular, e.g., suggesting a possible cyber-attack (e.g., a MITM attack), such as if a large number of pairing events have occurred in a short time window. For example, if communication event timestamps 406 indicate a large number of recent pairing time stamps, the signal strength threshold may be adjusted to a higher signal strength, e.g., to prohibit communications from an edge of the BLE network link from possible bad actors.

User attention data 408 may be associated with determination of whether user 203 is actively operating his or her user device 238. In some embodiments, user attention data 408 may be indicative of whether user 203 is interacting with the vehicle application implemented at user device 238 and/or whether user device 238 is on or off. For example, if processing circuitry 140 detects that user 203 is navigating through, or inputting commands or requests in association with, user interface screens of the vehicle application, processing circuitry 140 may determine that user 203 is attempting to communicate with vehicle 201 via the BLE link, and may facilitate such communication by, e.g., reducing the signal strength threshold. On the other hand, if user 203 is determined not to be interacting with user device 138 at all or to be interacting with an application that is unrelated to the vehicle application, processing circuitry 140 may increase the signal strength threshold or prohibit certain communication commands.

FIG. 4 shows a block diagram of an illustrative machine learning model 400 for use in managing communication between a user device and a vehicle, in accordance with some embodiments of the present disclosure. Machine learning model 400 may be implemented by one or more of user device 138 and/or server 136 and/or vehicle 101. In some embodiments, machine learning model 400 may be implemented as a neural network, e.g., a recurrent neural network, such as, for example, Long Short Term Memory (LSTM) network or any other suitable machine learning model trained to assist in predicting a suitable signal strength threshold and/or suitable signal strengths for each zone boundary, and outputting a determination of whether to enable a communication command to be sent from user device 138 to vehicle 101. In some embodiments, machine learning model may be trained to output an indication of which BLE commands are suitable to be enabled in the particular circumstances indicated by the input data.

In some embodiments, machine learning model 400 may be trained using historical data (e.g., historical RSSI streaming data, temperature data, humidity data, location data, communication event timestamps, user attention data) which may be associated with user 203 and/or historical data of any other suitable number of other users (e.g., users associated with user profiles having similar characteristics to a user profile of user 203). Such training data may be labeled, e.g., with a signal strength threshold and/or boundary thresholds for each zone, that is optimal for a certain combination of input data, to enable machine learning model 400 to learn certain patterns of input that are indicative of whether to enable certain communication commands between user device 138 and vehicle 101. Each training example may be associated with a vector of any suitable number of dimensions encoding information specifying each category of historical data. In some embodiments, initial weights may be chosen randomly or by pre-training using a deep belief network. Training may be performed in either a supervised, partially supervised, or unsupervised manner. In some embodiments, machine learning model 400 may be capable of being trained to learn order dependence in sequence prediction.

In some embodiments, the historical training data used during training, as well as input data 402, 404, 406, 408 inputted to trained machine learning model 400, may be pre-processed. For example, at 415, a windowing process may be performed on RSSI data 402 to average samples of RSSI over a sliding interval or window and address decoding of location coordinates may be performed. In some embodiments, preprocessing may be performed to convert the training data and inputted data into vector or matrix representation, and/or to match formatting of the inputted data to formatting of training data. In some embodiments, trained machine learning model 400 may be trained to dynamically adjust the signal strength threshold based on patterns recognized during training. For example, the training data may indicate that user device 138 historically failed (e.g., freezes or deadlocks) when the user device 138 attempts to send encrypted communications from an edge of the BLE range. At 416 and 418, based on this particular training data, machine learning model 400 may predict, upon receiving input data similar to the particular training data, that the signal strength threshold should be stricter, e.g., the signal strength threshold should be increased. In some embodiments, using the contextual information to train the machine learning model may enable user device 138 to avoid the manual or rule-based calibration of the factors of the historical data (e.g., the machine learning model may learn suitable signal strength thresholds for certain humidity and temperature conditions over time).

In some embodiments, (e.g., such as if a regression classifier is used) the untrained machine learning model may be trained using supervised learning, wherein the training dataset may comprise an input paired with a desired output, and/or the training dataset may include input having known output and outputs of neural networks are manually graded. In some embodiments, the untrained machine learning model may be trained in a supervised manner. Inputs from the training dataset may be processed and compared against resulting outputs against a set of expected or desired outputs. In some embodiments, errors may then be propagated back through untrained machine learning model, and processing circuitry of server 136 and/or processing circuitry of user device 138 may adjust weights to optimize the untrained machine learning model. Tools to monitor how well the untrained machine learning is converging towards a model may be employed, such as trained machine learning model 400, suitable for generating correct answers based on known input data. In some embodiments, untrained neural network may be trained repeatedly while adjusting weights to refine an output of the untrained neural network using a loss function and adjustment process, such as stochastic gradient descent. In some embodiments, the untrained machine learning model may be trained until a desired accuracy is achieved. Trained machine learning model 400 can then be deployed to implement any number of machine learning operations.

In some embodiments, the untrained machine learning model may be trained using unsupervised learning, wherein the untrained machine learning model may attempt to train itself using unlabeled data. In some embodiments, unsupervised learning training dataset may include input data without any associated output data or "ground truth" data. The untrained machine learning model can learn groupings within the training dataset and can determine how individual inputs are related to the untrained dataset. In some embodiments, unsupervised training can be used to generate a self-organizing map, which is a type of trained machine learning model 400 capable of performing operations useful in reducing dimensionality of new data. Unsupervised training can also be used to perform anomaly detection, which allows identification of data points in a new dataset that deviate from normal or existing patterns of a new dataset. In some embodiments, semi-supervised learning may be used, which is a technique in which the training dataset includes a mix of labeled and unlabeled data, to perform incremental learning, such as through transferred learning techniques. Such incremental learning may enable trained machine learning model 400 to adapt to new data without forgetting knowledge instilled within the network during initial training.

Figure 5:
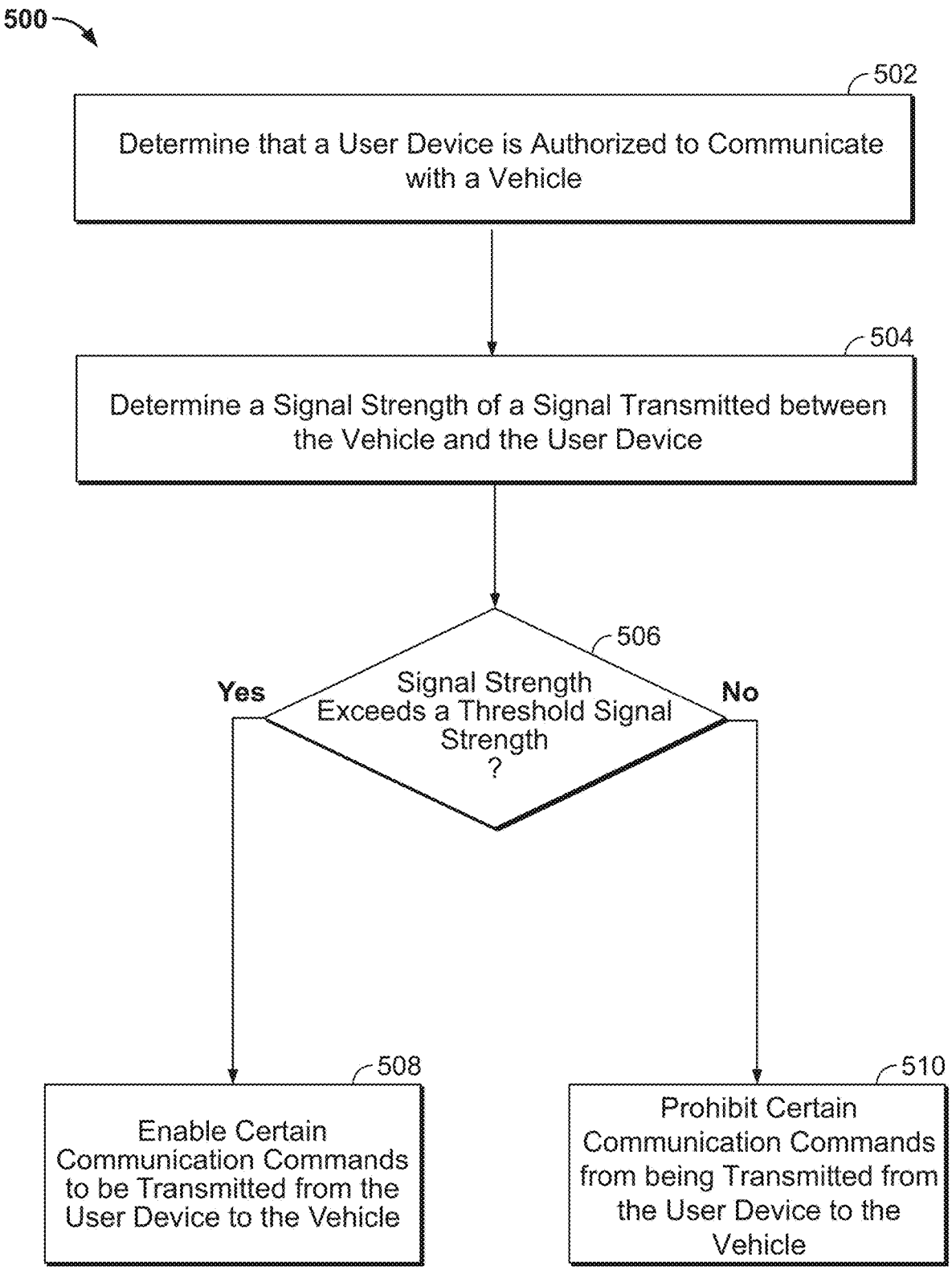
FIG. 5 shows a flowchart of illustrative process for determining whether to enable a communication command to be transmitted from the user device to the vehicle, in accordance with some embodiments of the present disclosure.

FIG. 5 shows a flowchart of illustrative process 500 for determining whether to enable a communication command to be transmitted from the user device to the vehicle, in accordance with some embodiments of the present disclosure. Process 500 may be executed at least in part by processing circuitry 140 of user device 138 and/or processing circuitry of server 136 and/or processing circuitry 102 of vehicle 101 and/or processing circuitry 102 of vehicle 101, or any other suitable circuitry, or any combination thereof.

At 502, processing circuitry 140 and/or processing circuitry 102 may determine whether user device 138 is authorized to communicate with vehicle 101. For example, user device 138 may be authorized to communicate with vehicle 101 based on having participated in a previous communication session with vehicle 101, and/or based on being present on a list of devices authorized to communicate with vehicle 101 (e.g., specified by an owner or vehicle 101 via his or her profile). For example, an advertising packet or other signal transmitted or broadcast by vehicle 101 may comprise a vehicle identifier and/or vehicle application identifier, and/or an advertising packet or other signal transmitted or broadcast by user device 138 may comprise a user device identifier or mobile application identifier. Processing circuitry 140 and/or processing circuitry 102 may determine whether user device 138 is authorized to communicate with vehicle 101 based on such received identifier(s). For example, the received identifier(s) may be compared to identifiers associated with previous communication sessions or identifiers specified as otherwise having authorization to communicate with vehicle (e.g., stored at memory 106, memory 144 and/or at server 136, and/or at any other suitable portion of system 100).

In some embodiments, if based on such comparison a match is determined indicating that user device 138 is authorized to communicate with vehicle 101, the signal strength determination and/or subsequent processing may be performed. On the other hand, if based on such comparison no match is determined, thus indicating that user device 138 is not authorized to communicate with vehicle 101, another process may be initiated to authorize user device 138. For example, a prompt may be generated for display at user device 138 requesting login credentials associated with a user account or profile associated with vehicle 101, and upon validating such login credentials, the signal strength determination and/or subsequent processing may be performed. In some embodiments, 502 may be omitted from process 500.

At 504, processing circuitry 140 may determine a signal strength of a signal 158 transmitted between vehicle 101 and user device 138. In some embodiments, processing may proceed from 502 to 504 based on user device 138 having been validated as authorized to communicate with vehicle 101 at 502. In some embodiments, a signal used to validate user device 138 at 502 may be the same signal having its signal strength determined at 504, or a such signals may be different. In some embodiments, at 504, processing circuitry 140 may determine an RSSI value of signal 158 (e.g., −85 dBm), which may be an advertising packet transmitted by vehicle 101. The determined RSSI value may be indicative of a zone at which user device 138 is associated, e.g., zone 202 of FIG. 2B, as specified by virtual BLE fencing map generated by processing circuitry 140.

At 506, processing circuitry 140 may determine whether the signal strength determined at 504 exceeds a threshold signal strength, e.g., by comparing the determined RSSI to a threshold RSSI. For example, the threshold signal strength may correspond to a boundary of a particular zone of the BLE fencing map, e.g., 90 dBm. In some embodiments, the threshold may be dynamically determined based on a variety of factors, e.g., location data 404, temperature data, humidity data, communication event timestamps 406, user attention data 408, using any suitable technique (e.g., heuristics and/or machine learning model 400).

At 506, processing circuitry 140 may determine that the determined RSSI value of signal 158 (e.g., −85 dBm) exceeds or is equal to the threshold signal strength (e.g., −90 dBm). In response to such determination, processing circuitry 140 may at 508 enable certain communication commands to be transmitted from user device 138 to vehicle 101, e.g., by way of the vehicle application implemented on user device 138. For example, the communication command may correspond to a request signal 156 to initiate a connection with vehicle 101 (e.g., in response to an advertising packet received from vehicle 101), such as by establishing bidirectional communications between vehicle 101 and user device 138. In some embodiments, the communication command may correspond to a request for certain data (e.g., characteristic attributes, such as, for example, a battery level of vehicle 101), such as by initiating a pairing or bonding process to allow for encrypted communications comprising such data.

At 510, processing circuitry 140 may prohibit certain communication command from being transmitted from the vehicle 101 to user device 138, in response to determining (at 506) that the determined RSSI value of signal 158 (e.g., −85 dBm) is lower than the threshold signal strength (e.g., −90 dBm). Thus, certain undesirable behaviors of user device 138, which may occur when user device 138 is at an edge of the BLE signal zone and is attempting communications with vehicle 101, may be avoided.

Figure 6:
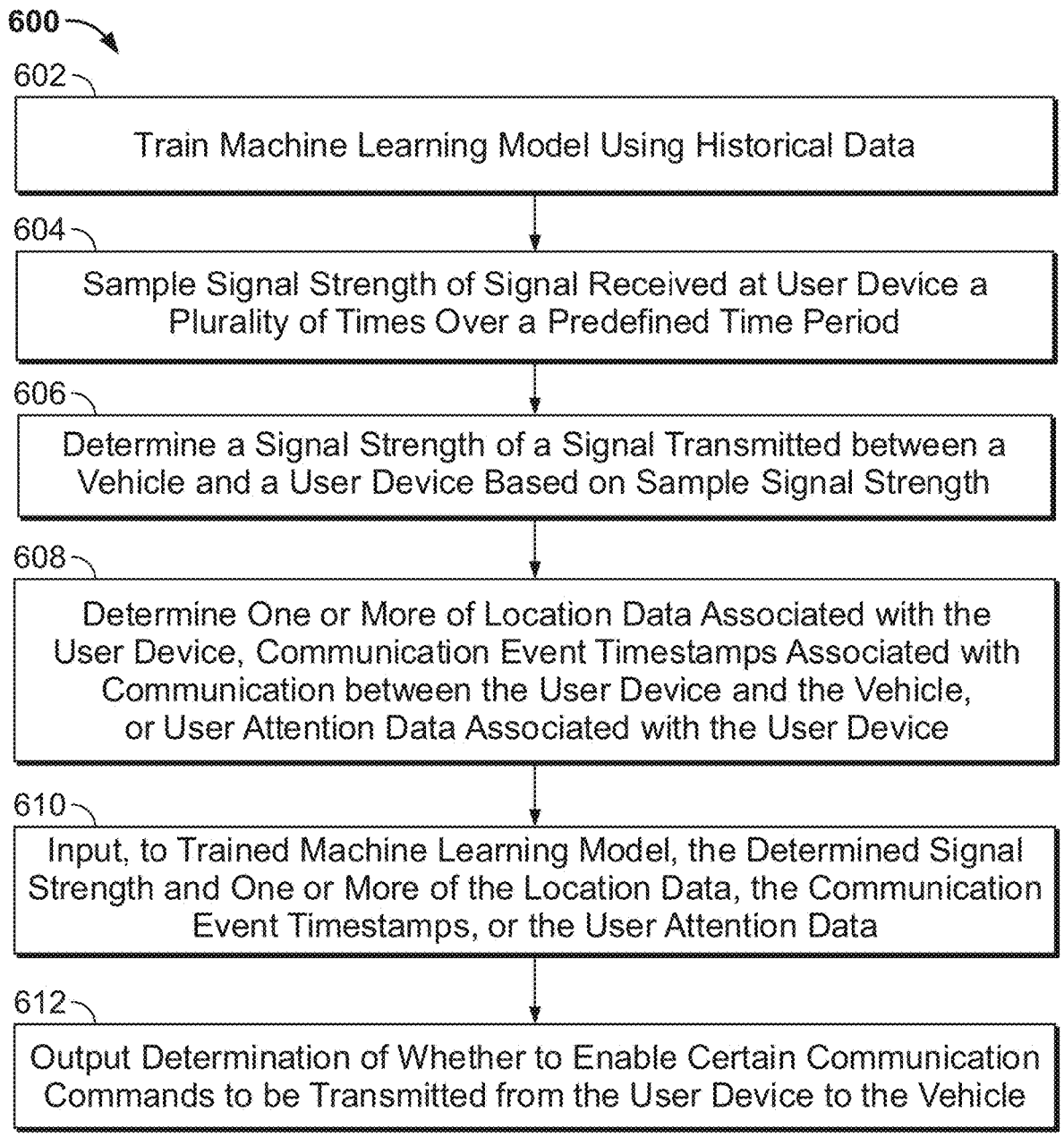
FIG. 6 shows a flowchart of illustrative process for determining whether to enable a communication command to be transmitted from the user device to the vehicle, in accordance with some embodiments of the present disclosure.

FIG. 6 shows a flowchart of illustrative process 600 for determining whether to enable a communication command to be transmitted from the user device to the vehicle, in accordance with some embodiments of the present disclosure. Process 600 may be executed at least in part by processing circuitry 140 of user device 138 and/or processing circuitry of server 136 and/or processing circuitry 102 of vehicle 101, or any other suitable circuitry, or any combination thereof.

At 602, processing circuitry 140 may train machine learning model 400 using historical data, e.g., RSSI data, location data, temperature data, humidity data, communication event timestamps, user attention data In some embodiments, machine learning model 400 may be a recurrent neural network, e.g., Long Short Term Memory (LSTM) network.

At 604, processing circuitry 140 may sample the respective signal strengths (e.g., RSSI data) of a signal received at user device 138 at a plurality of times over a predefined time period. Any suitable sampling rate may be employed, e.g., 10 samples per second, and a measurement may be performed every 3 seconds. At 606, processing circuitry 140 may determine a signal strength (e.g., RSSI data) of signal 158 transmitted between vehicle 101 and user device 138 based on the sampled signal strengths. In some embodiments, an average from among the RSSI data associated with the sampled signals may be computed and used as the signal strength value to be compared to a signal strength threshold.

At 608, processing circuitry 140 may determine contextual information associated with user device 138 and vehicle 101, such as, for example, one or more of location data 404 associated with the user device 318, temperature data, humidity data, communication event timestamps 406 associated with communication between user device 318 and vehicle 101, or user attention data 408 associated with user device 138 The contextual information may be useful in tailoring selection of a signal strength threshold for a particular circumstance, e.g., it may be desirable for usage of user device commands to be less restrictive if location data indicates user 203 is at home as opposed to a parking lot at a shopping mall.

At 610, processing circuitry 140 may input to the trained machine learning model 400 the RSSI data 402 (determined at 606), and one or more of the location data 404, temperature data, humidity data, communication event timestamps 406, or user attention data 408. At 612, processing circuitry 140 may output a determination of whether to enable certain communication commands to be transmitted from user device 138 to vehicle 101. In some embodiments, machine learning model 400 may be configured to select an optimal signal strength threshold, based on the various inputs to the machine learning model, in order to dynamically provide a signal strength threshold suitable to the particular circumstances. For example, such optimal signal strength threshold output by machine learning model 400 may be used by processing circuitry 102 of vehicle 101 (e.g., by way of electronic control modules of vehicle) to adjust the current signal strength threshold to the optimal signal strength threshold. In some embodiments, machine learning model 400 may be running at vehicle 101, and the optimal signal strength threshold output by machine learning model 400 may be, e.g., transferred from one vehicle module (e.g., a central gateway model) to another electric control unit of vehicle 101. In some embodiments, machine learning model 400 may be running at server 136, and in such an instance the optimal signal strength threshold output by machine learning model 400 may be transmitted via network 105 to vehicle 101 for storage and for use by vehicle 101 in adjusting the signal strength threshold.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A method comprising:
   determining that a user device is authorized to communicate with a vehicle;
   determining, by the user device, a first signal strength of a first signal transmitted by the vehicle and received at the user device at a first time;
   determining, by the user device, whether the first signal strength of the first signal received at the user device from the vehicle exceeds a threshold signal strength;
   in response to determining, by the user device, that the first signal strength of the first signal received at the user device from the vehicle does not exceed the threshold signal strength, prohibiting, by the user device, transmission of a first communication command from the user device to the vehicle; and
   in response to determining that a second signal strength of a second signal, received at the user device from the vehicle at a second time, exceeds the threshold signal strength, enabling a vehicle application implemented on the user device to transmit a second communication command to the vehicle.

2. The method of claim 1, wherein:
   the user device is a smartphone.

3. The method of claim 1, wherein:
   the user device is a smartphone; and
   the second communication command comprises a packet to initiate a connection between the user device and the vehicle.

4. The method of claim 1, wherein determining the first signal strength of the first signal transmitted by the vehicle and received at the user device is performed based on sampling the first signal strength of the first signal a plurality of times over a predefined time period.

5. The method of claim 1, wherein the second communication command is transmitted using Bluetooth Low Energy communication protocol.

6. The method of claim 1, further comprising:
   determining one or more of location data associated with the user device, temperature data associated with a location of the user device, humidity data associated with the location of the user device, communication event timestamps associated with communication between the user device and the vehicle, or user attention data associated with the user device; and
   adjusting the threshold signal strength based on at least one of the location data, the temperature data, the humidity data, the communication event timestamps, or the user attention data.

7. The method of claim 1, further comprising:
   determining one or more of location data associated with the user device, temperature data associated with a location of the user device, humidity data associated with the location of the user device, communication event timestamps associated with communication between the user device and the vehicle, or user attention data associated with the user device,
   wherein prohibiting, by the user device, transmission of the first communication command from the user device to the vehicle is further performed based on at least one of the location data, the temperature data, the humidity data, the communication event timestamps, or the user attention data.

8. The method of claim 7, wherein prohibiting, by the user device, transmission of the first communication command from the user device to the vehicle further comprises:
   training a machine learning model to accept as input the determined first signal strength and at least one of the location data, the temperature data, the humidity data, the communication event timestamps, or the user attention data, and output a determination of whether to prohibit the transmitting of the first communication command from the user device to the vehicle.

9. A non-transitory computer-readable medium having non-transitory computer-readable instructions encoded thereon that, when executed by a processor of a user device, causes the processor to:
   determine that the user device is authorized to communicate with a vehicle;
   determine a first signal strength of a first signal transmitted by the vehicle and received at the user device at a first time;
   determine whether the first signal strength of the first signal received at the user device from the vehicle exceeds a threshold signal strength;
   in response to determining that the first signal strength of the first signal received at the user device from the vehicle does not exceed the threshold signal strength, prohibit transmission of a first communication command from the user device to the vehicle; and
   in response to determining that a second signal strength of a second signal, received at the user device from the vehicle at a second time, exceeds the threshold signal strength, enable a vehicle application implemented on the user device to transmit a second communication command to the vehicle.

10. The non-transitory computer-readable medium of claim 9, wherein:
    the user device is a smartphone.

11. The non-transitory computer-readable medium of claim 9, wherein:
    the user device is a smartphone; and
    the second communication command comprises a packet to initiate a connection between the user device and the vehicle.

12. The non-transitory computer-readable medium of claim 9, wherein the execution of the instructions to determine the first signal strength of the first signal transmitted by the vehicle and received at the user device further causes the processor to sample the first signal strength of the first signal a plurality of times over a predefined time period.

13. The non-transitory computer-readable medium of claim 9, wherein the execution of the instructions further causes the processor to:
    determine one or more of location data associated with the user device, temperature data associated with a location of the user device, humidity data associated with the location of the user device, communication event timestamps associated with communication between the user device and the vehicle, or user attention data associated with the user device; and adjust the threshold signal strength based on at least one of the location data, the temperature data, the humidity data, the communication event timestamps, or the user attention data.

14. The non-transitory computer-readable medium of claim 9, wherein the second communication command is transmitted using Bluetooth Low Energy communication protocol.

15. The non-transitory computer-readable medium of claim 9, wherein the execution of the instructions further causes the processor to:

determine one or more of location data associated with the user device, temperature data associated with a location of the user device, humidity data associated with the location of the user device, communication event timestamps associated with communication between the user device and the vehicle, or user attention data associated with the user device; and prohibit transmission of the first communication command from the user device to the vehicle further by:

training a machine learning model to accept as input the determined first signal strength and at least one of the location data, the temperature data, the humidity data, the communication event timestamps, or the user attention data, and output a determination of whether to prohibit the transmitting of the first communication command from the user device to the vehicle.

16. A system comprising:

a vehicle configured to communicate with a user device; and processing circuitry of the user device configured to:

determine that the user device is authorized to communicate with the vehicle;

determine a first signal strength of a first signal transmitted by the vehicle and received at the user device at a first time;

determine whether the first signal strength of the first signal received at the user device from the vehicle exceeds a threshold signal strength;

in response to determining that the first signal strength of the first signal received at the user device from the vehicle does not exceed the threshold signal strength, prohibit transmission of a first communication command from the user device to the vehicle; and in response to determining that a second signal strength of a second signal, received at the user device from the vehicle at a second time, exceeds the threshold signal strength, enable a vehicle application implemented on the user device to transmit a second communication command to the vehicle.

17. The system of claim 16, wherein:
the user device is a smartphone.

18. The system of claim 16, wherein:
the user device is a smartphone;
wherein the first communication command is transmitted using Bluetooth Low Energy communication protocol.

19. The method of claim 1, further comprising:
determining one or more of temperature data associated with a location of the user device or humidity data associated with the location of the user device; and adjusting the threshold signal strength based on at least one of the temperature data or the humidity data.

20. The method of claim 1, wherein the threshold signal strength is a first threshold signal strength, the method further comprising:

determining, by the user device, that the first signal strength of the first signal transmitted by the vehicle and received at the user device exceeds a second threshold signal strength, wherein the first threshold signal strength exceeds the second threshold signal strength;

determining that the first communication command is included in one or more communication commands permitted to be transmitted when the first signal strength exceeds the first threshold signal strength; and determining that the first communication command is not included in one or more communication commands permitted to be transmitted when the first signal strength exceeds the second threshold signal strength but does not exceed the first threshold signal strength, wherein prohibiting, by the user device, transmission of the first communication command from the user device to the vehicle is further performed in response to determining that:

the first signal strength of the first signal transmitted by the vehicle and received at the user device exceeds the second threshold signal strength but does not exceed the first threshold signal strength; and the first communication command is not included in one or more communication commands permitted to be transmitted when the first signal strength exceeds the second threshold signal strength but does not exceed the first threshold signal strength.

* * * * *